United States Patent [19]

Hartson et al.

[11] Patent Number: 4,941,048

[45] Date of Patent: Jul. 10, 1990

[54] DECODER-OPERATED TELEVISION SIGNAL SWITCH

[75] Inventors: Ted E. Hartson, Scottsdale, Ariz.; Gordon E. Kelly, Algonquin, Ill.

[73] Assignee: Zenith Electronics Corporation, Glenview, Ill.

[21] Appl. No.: 284,036

[22] Filed: Dec. 14, 1988

[51] Int. Cl.[5] .......................................... H04B 11/16
[52] U.S. Cl. .................................... 358/181; 455/4; 455/151; 307/141
[58] Field of Search .......... 358/181, 188, 190, 194.1; 455/3, 4, 151; 307/141, 125, 126

[56] References Cited

U.S. PATENT DOCUMENTS

| | | | |
|---|---|---|---|
| 4,015,074 | 3/1977 | Inoue et al. | 455/4 |
| 4,424,591 | 1/1984 | Boardman | 358/181 X |
| 4,463,382 | 7/1984 | Pellegrini et al. | 358/181 |
| 4,527,204 | 7/1985 | Kozakai et al. | 455/4 X |
| 4,630,313 | 12/1986 | Damoci | 455/4 |
| 4,783,846 | 11/1988 | Wachob | 455/151 |

*Primary Examiner*—James J. Groody
*Assistant Examiner*—Mark R. Powell

[57] ABSTRACT

An enclosure, including an automatic television signal switch, has four coaxial cable connectors, a first for bringing in an input television signal, a second and a third for supplying signals to and from a decoder, and a fourth for supplying television signals to a television receiver. A signal splitter is connected to the first connector and supplies one television signal to a decoder via the second connector and another television signal to a first stationary contact of a relay. The second relay stationary contact is connected to the third connector which receives decoded signals from the decoder. The movable contact of the relay is connected to the fourth connector. The relay is powered by an internal DC power supply that is connected via a line cord and plug to a switched AC power outlet on the decoder. Turning the decoder on automatically energizes the relay to pass input the television signal to the decoder. When the decoder is off, the relay bypasses the decoder and passes input television signals directly to the television receiver.

8 Claims, 1 Drawing Sheet

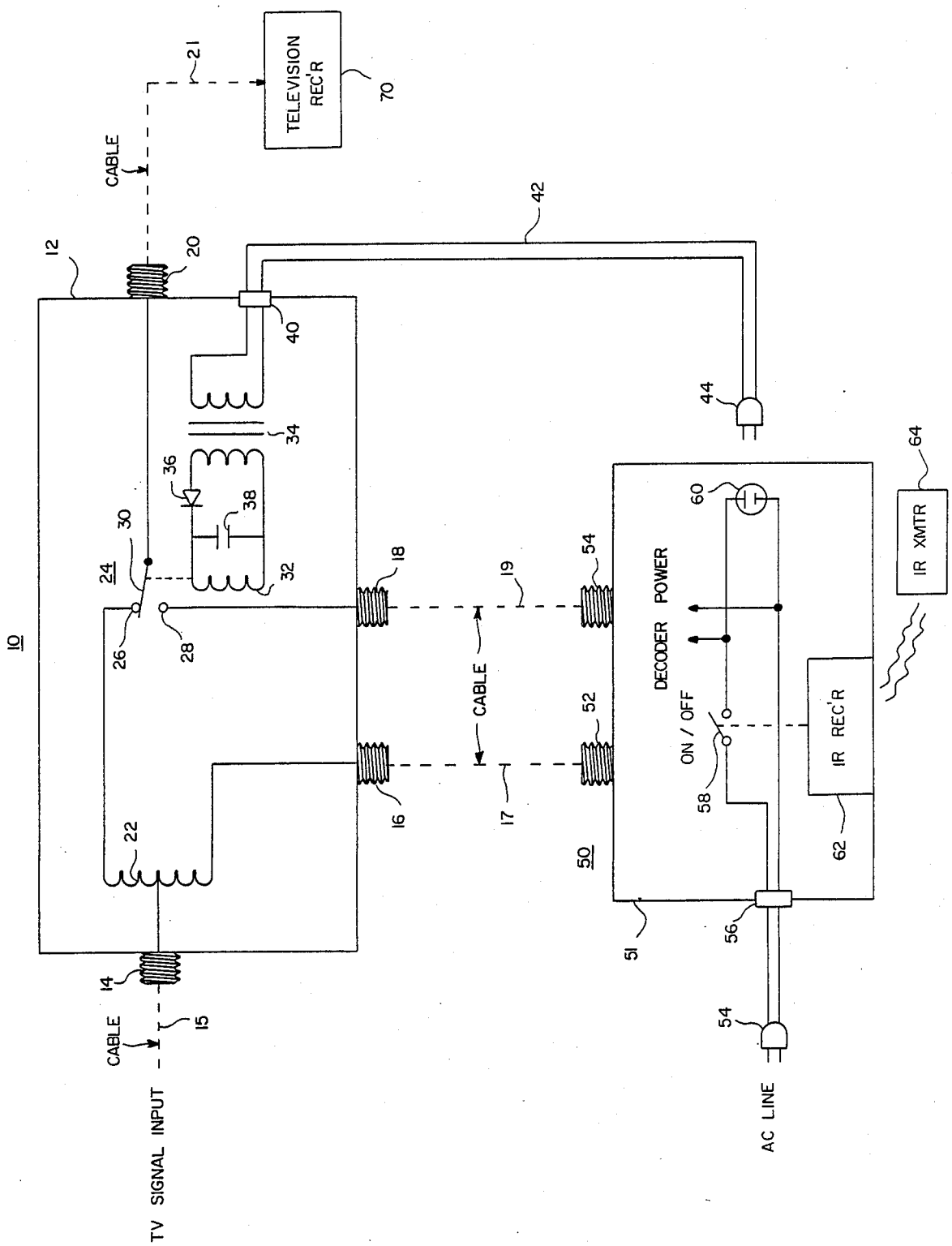

DECODER-OPERATED TELEVISION SIGNAL SWITCH

BACKGROUND OF THE INVENTION AND PRIOR ART

This invention relates generally to television signal switching and particularly to an automatic switch that selectively supplies television signals to a television signal utilization device, such as a VCR or television receiver from a decoder output and a cable input in response to operation of the decoder.

In conventional CATV systems, a television receiver is typically connected to an RF output terminal of a decoder. The decoder, which also includes an RF input terminal connected for receiving a plurality of program channel signals from the CATV distribution system, only produces a signal output on one channel, generally VHF channel 3 or VHF channel 4. This arrangement restricts the use of the television receiver to channel 3/4 and requires that various program channel selections be made via the tuner in the decoder. The panoply of functions available on a modern television receiver are therefore not available to the viewer. This is unfortunate because in most CATV systems, the majority of the program channel signals are not encoded and may be received and processed directly by a television receiver that has a tuner capable of receiving the program channel frequencies. Here again, most modern television receivers are capable of directly receiving all CATV channel signals.

Viewers will sometimes use a signal splitter along with a manually operable A/B switch to allow selective coupling of the decoder output and input CATV signal to the input of the television receiver. This, however, requires manual operation of the A/B switch between the decoder output and the CATV input.

With the automatic switch of the invention, such manual operations are avoided because the input television signals automatically bypass the decoder when the decoder is not needed, i.e., when it is turned off. The automatic switch is in a separate enclosure that is connectable to the decoder and television receiver, or other television signal utilization device by means of coaxial cables. A built-in power supply for operating the automatic switch is controlled by a line cord connection to a switched outlet on the decoder.

OBJECTS OF THE INVENTION

A principal object of the invention is to provide a novel automatic television signal switch.

Another object of the invention is to provide an improved CATV viewing system.

BRIEF DESCRIPTION OF THE DRAWING

These and other objects and advantages of the invention will be apparent upon reading the following description in conjunction with the drawing, the single figure of which is a partial schematic diagram of an automatic television signal switch constructed in accordance with the invention.

DESCRIPTION OF THE PREFERRED EMBODIMENT

Referring to the single figure, reference numeral 10 generally designates the automatic switch of the invention, which is enclosed in a housing 12 that has a plurality of 75 ohm coaxial cable connectors 14, 16, 18 and 20 mounted thereon. A coaxial cable 15 is indicated as being connected, via first cable connector 14, to a television signal input, which may comprise the subscriber connection to the cable system head end. A conventional signal splitter 22 has its center tap connected to cable 15, a first output connected to second cable connector 16 and a second output connected to a first stationary contact 26 of a relay 24. A second stationary contact 28 of relay 24 is connected to third cable connector 18 and the movable contact 30 is connected to fourth cable connector 20. Relay 24 includes a relay coil 32 that is energized by means of a DC power supply that includes a transformer 34, a diode 36 and a capacitor 38. The input power line 42 to transformer 34 passes through an insulator 40 mounted in a wall of housing 12 and terminates in a conventional power plug 44. Automatic switch 10 is thus seen to include a separate enclosure or housing that is connectable to a decoder 50, a television receiver 70 (or other television signal utilization device) and a cable system by means of coaxial cables and a power cord.

Decoder 50 shows only the circuitry of interest to the invention and excludes all signal processing circuitry, which is in all respects, conventional. Decoder 50 includes input and output 75 ohm coaxial cable connectors 52 and 54. Connector 52 comprises the input to the decoder and is connected to second connector 16 of switch 10 by means of a coaxial cable 17. It will be appreciated that, absent the present invention, connector 52 of decoder 50 would be the input from the cable system head end. Cable connector 54 is connected to third connector 18 of switch 10 by means of a cable 19 and supplies decoded television signals to the automatic switch 10. An AC source, not shown, is coupled to a power plug 54 at the end of a power cord that is fed through an insulator 56 to the interior of housing 51 of decoder 50. An on/off switch 58 in decoder 50 connects the AC line power to the decoder circuitry (not shown) and to an ordinary AC power outlet 60. Switch 58 is conventionally operated by an IR receiver 62 in decoder 50 in response to appropriate command signals sent by an IR transmitter 64 that is operated by a viewer. Finally, a coaxial cable 21 connects television receiver 70 to fourth cable connector 20.

In operation with decoder 50 turned off, switch 58 is open and line power is not supplied to the decoder nor to switched AC power outlet 60. Therefore the plug 44 connected to outlet 60 does not receive power and transformer 34 is not energized. Relay winding 32, which is not energized, has its movable contact 30 in the rest position illustrated in which it makes contact with first stationary contact 26. The input television signal at connector 14 is applied through splitter 22 to stationary contact 26 and movable contact 30 to television receiver 70 via cable connector 20 and cable 21. Thus any received television signals are directly coupled to television receiver 70 for processing. (Any signals that are scrambled will be received in scrambled condition by receiver 70 and not be viewable.)

Assume that IR transmitter 64 supplies an on/off command to decoder 50. Switch 58 is moved to its on position and supplies power to the decoder circuitry and energizes switched AC power outlet 60. AC power is supplied from plug 44, along power cord 42 to transformer 34 in switch 10. Rectification is performed by diode 36 and capacitor 38 and relay winding 32 is energized to switch movable contact 30 into contact with second stationary contact 28. In this position, all input television signals at coaxial cable connector 14 are supplied through splitter 22 to decoder 50 via coaxial cable connectors 16 and 52 and cable 17. The signals are processed and supplied from the decoder 50 via connector 54, cable 19 and connector 18, to switch 10. The signal path is completed through second stationary contact 28 and movable contact 30 of relay 34 to television receiver 70 via coaxial connector 20 and cable 21. In this position, with decoder 50 on, television receiver 70 receives only television signals that are supplied by decoder 50. The television receiver, of course, must therefore be tuned to channel 3/4 when the decoder is operated.

Thus, with the invention, a very simple and convenient automatic switch arrangement is provided for automatically supplying the full range of television channel program signals to a television receiver when the decoder is off and for switching the television signal path through the decoder when the decoder is on.

It is recognized that numerous changes and modifications in the described embodiment of the invention will be apparent to those skilled in the art without departing from its true spirit and scope. The invention is to be limited only as defined in the claims.

What is claimed is:

1. An automatic switch for use with a television signal utilization means and a television signal decoder means having a decoder input and a decoder output comprising:
   signal splitting means for receiving and supplying an input television signal to a first splitter output and to a second splitter output, said first splitter output being coupled to said decoder input;
   output coupling means for coupling television signals to said television signal utilization means;
   switch means, including a relay and an AC operated DC power supply for operating said relay, for selectively connecting said output coupling means between said second splitter output and said decoder output; and
   means including an AC power outlet for supplying power from said decoder means to energize said relay for connecting said output coupling means to said decoder output whenever said decoder means is turned on.

2. An automatic signal switch for use with a television signal decoder and a television signal utilization means comprising:
   an enclosure having four coaxial cable connectors mounted thereon, a first connector for connecting a source of television signals to the switch, a second connector and a third connector for coupling signals to and from, respectively, a television signal decoder and a fourth connector for coupling television signals to a television signal utilization device;
   a signal splitter having a splitter input connected to said first connector, a first splitter output connected to said second connector and a second splitter output;
   a relay having a first stationary contact connected to said second splitter output, a second stationary contact connected to said third connector and a movable contact connected to said fourth connector; and
   a switched power line for supplying power to said relay from said decoder for connecting said third and fourth connectors together whenever said television signal decoder is on.

3. The automatic switch of claim 1, further including a DC power supply in said enclosure connected to said power line for developing DC power for said relay responsive to said decoder being turned on, and wherein said power line includes a power plug for connection to a power outlet on said decoder.

4. In combination with a television signal decoder which comprises a power supply input, a power supply output, power switching means connected between the power supply input and power supply output, a decoder signal input, and a decoder signal output;
   signal switching means comprising an input connected to a source of television signals, an input connected to said decoder signal output, an output, and an actuation signal input; and
   circuit means, connected between said power supply output and said actuation signal input, for providing an actuation signal to operate said signal switching means.

5. The invention of claim 4 wherein the signal switching means comprises a relay.

6. The invention of claim 4 further comprising a splitter connecting said source of television signals to said decoder signal input.

7. The invention of claim 4 wherein the connections to said television signal decoder comprise detachable electrical connectors.

8. The invention of claim 5 wherein said power supply output provides ordinary AC power line voltage and said circuit means comprises a step-down transformer.

* * * * *